Feb. 12, 1924.
E. RIMAILHO
1,483,483
DISTANT CONTROL INSTALLATION FOR ANTIAIRCRAFT ARTILLERY
Filed Oct. 9, 1923   9 Sheets-Sheet 1
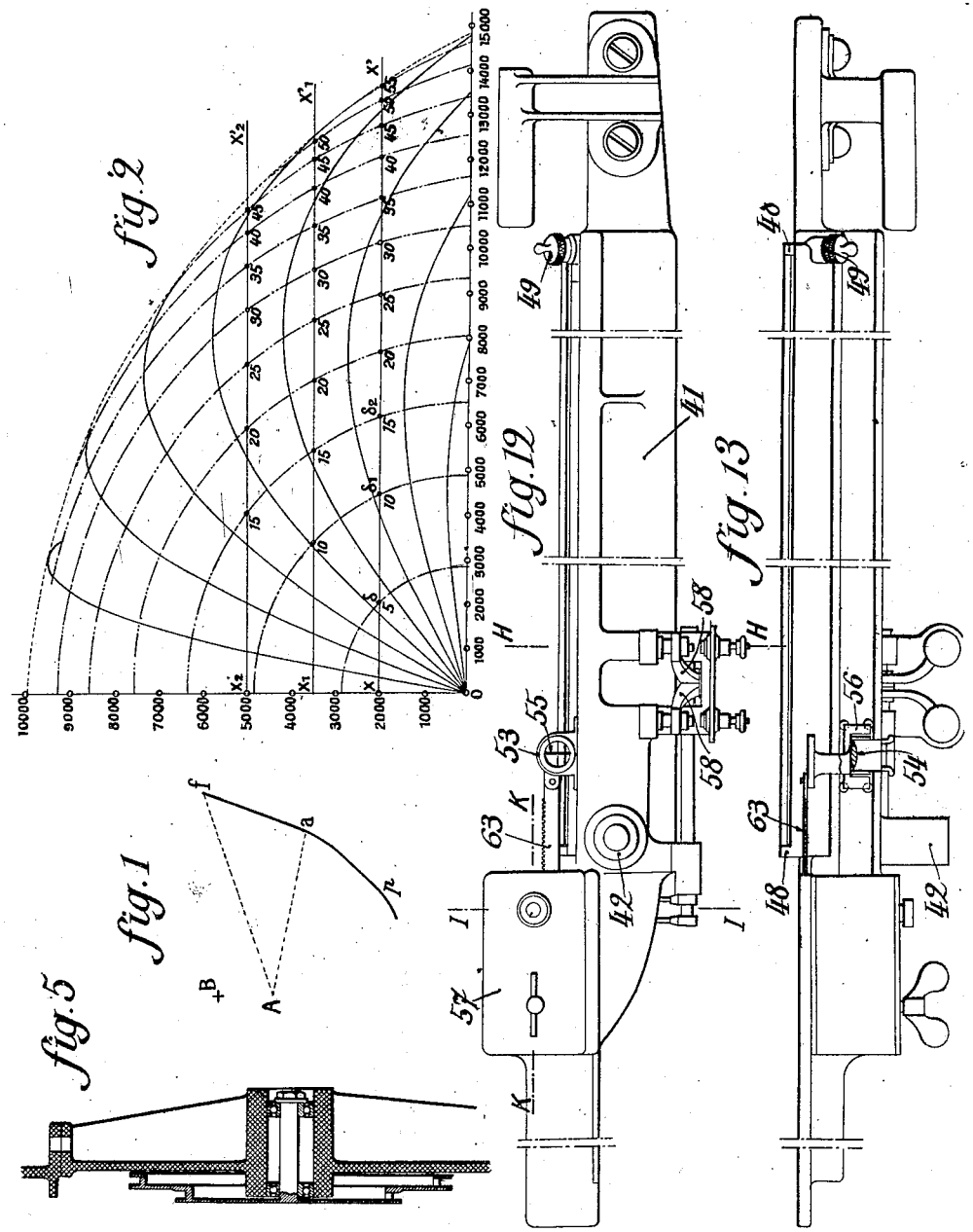

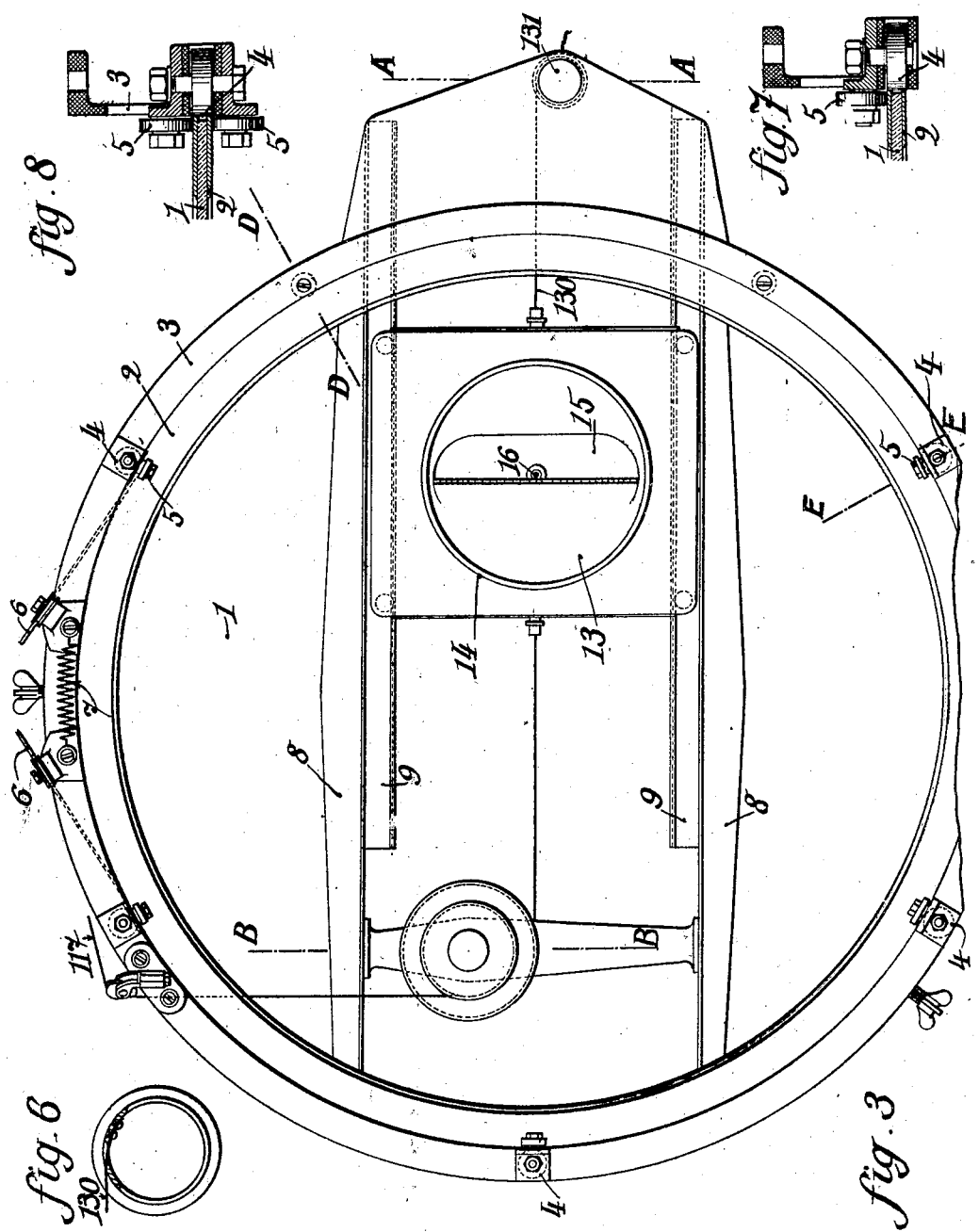

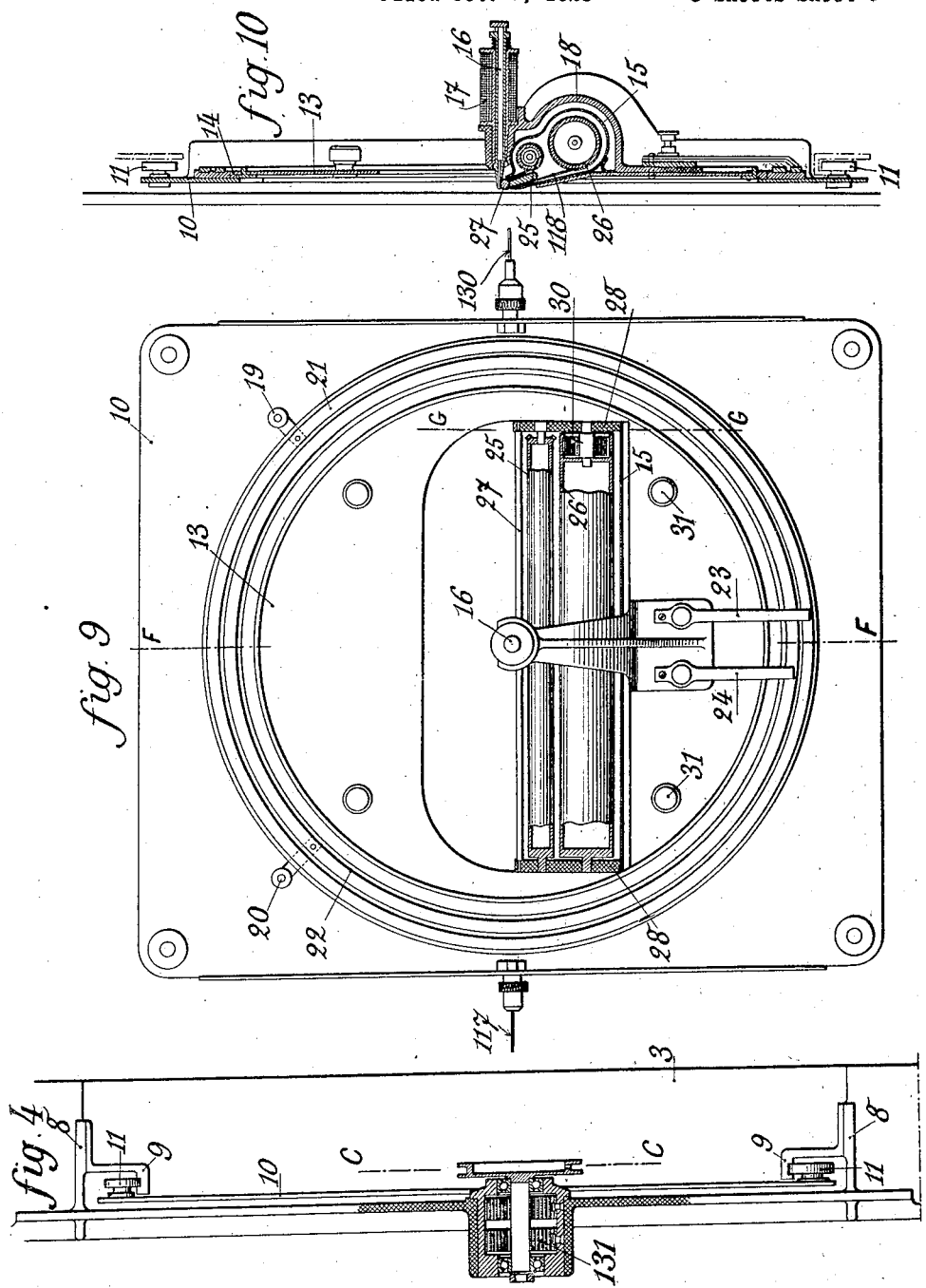

Feb. 12, 1924.
E. RIMAILHO
1,483,483
DISTANT CONTROL INSTALLATION FOR ANTIAIRCRAFT ARTILLERY
Filed Oct. 9, 1923    9 Sheets-Sheet 4
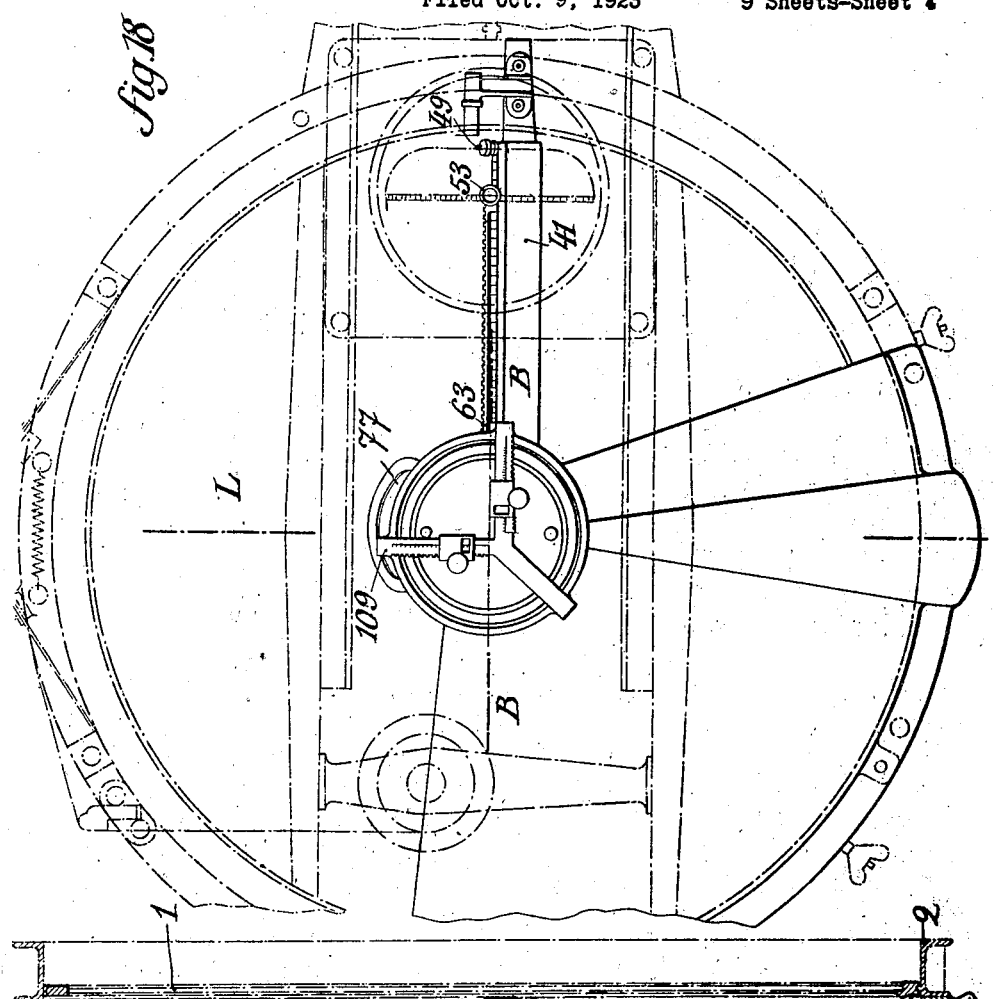
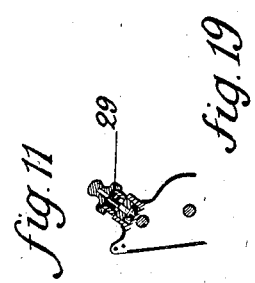

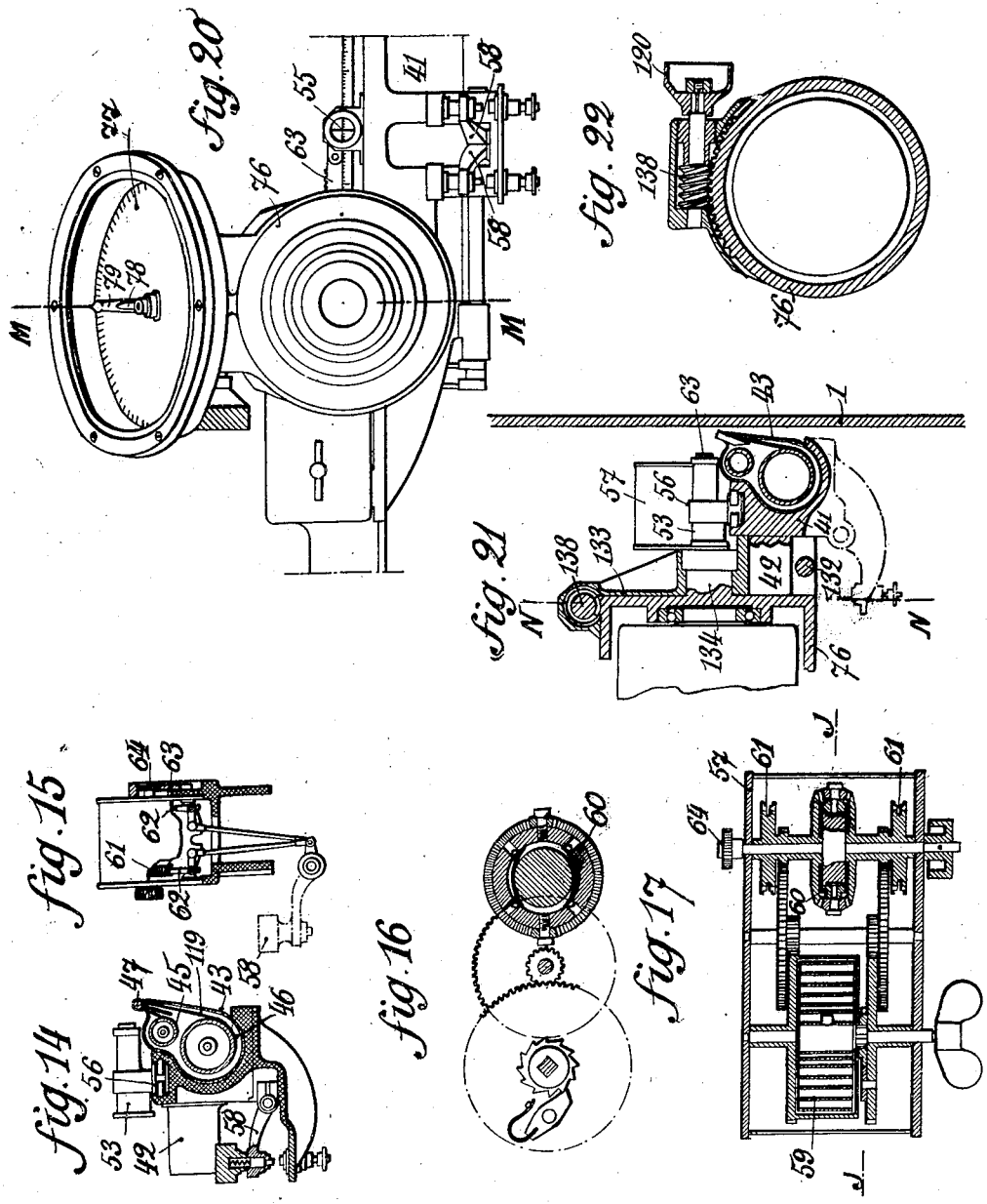

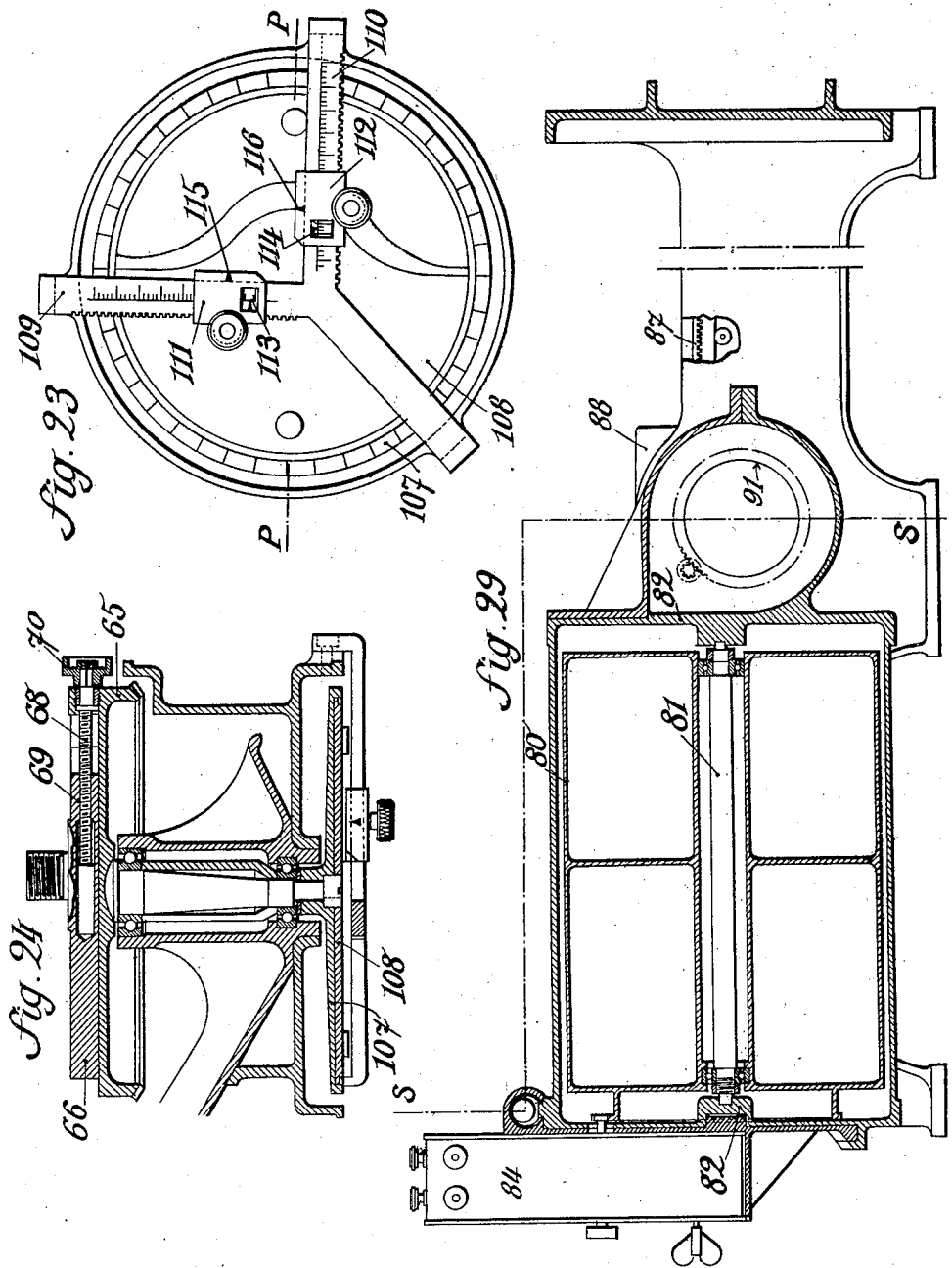

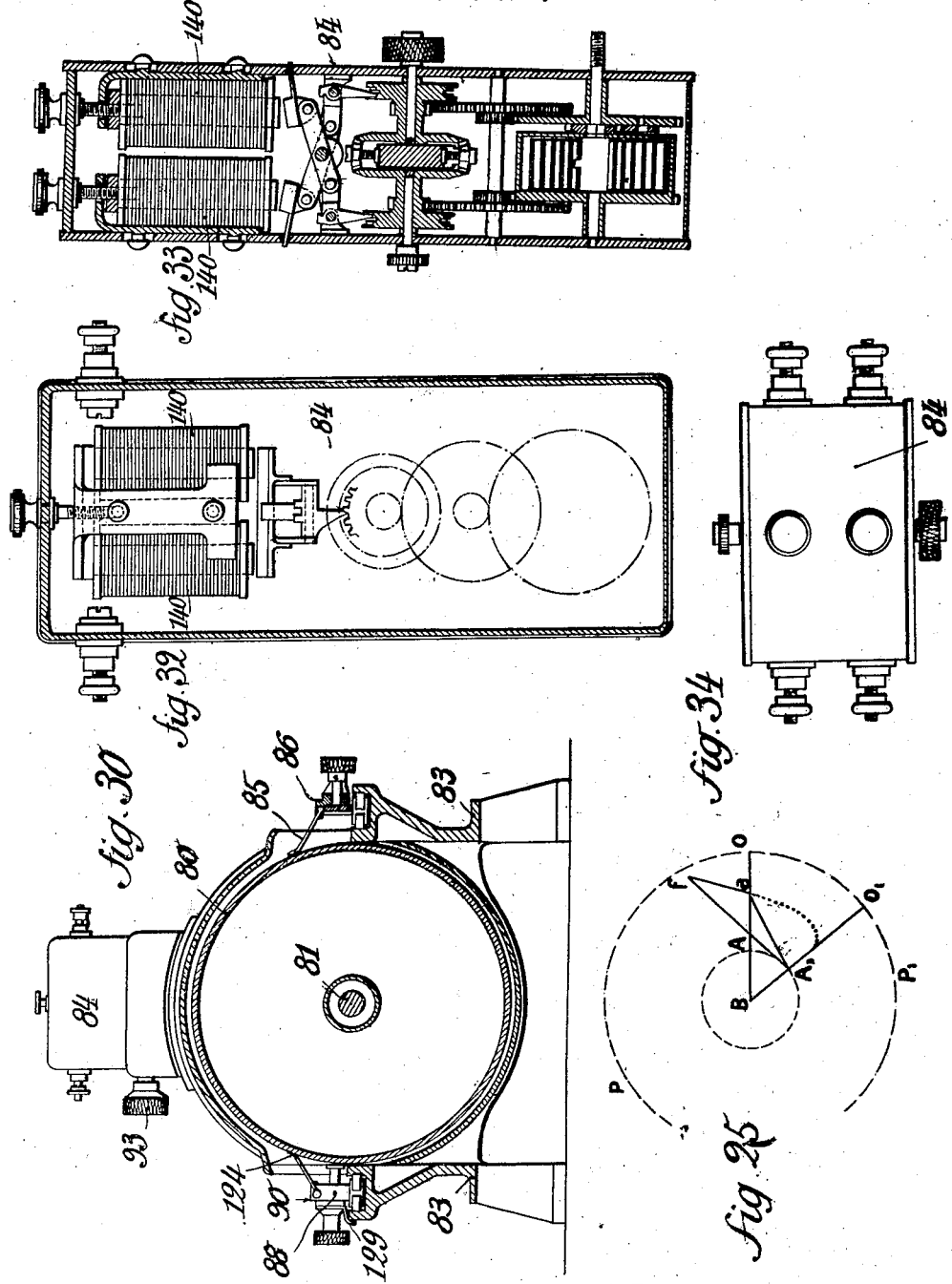

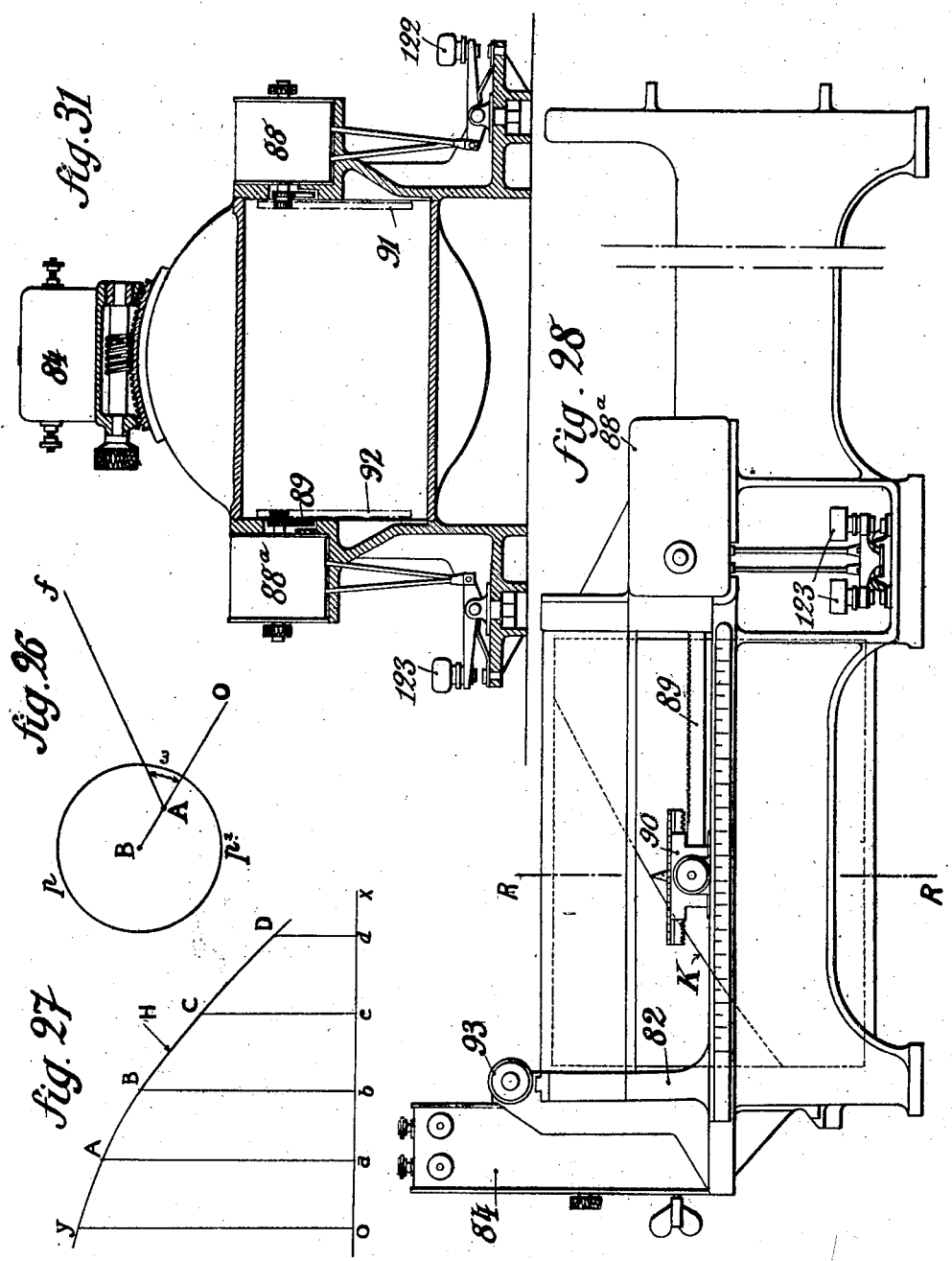

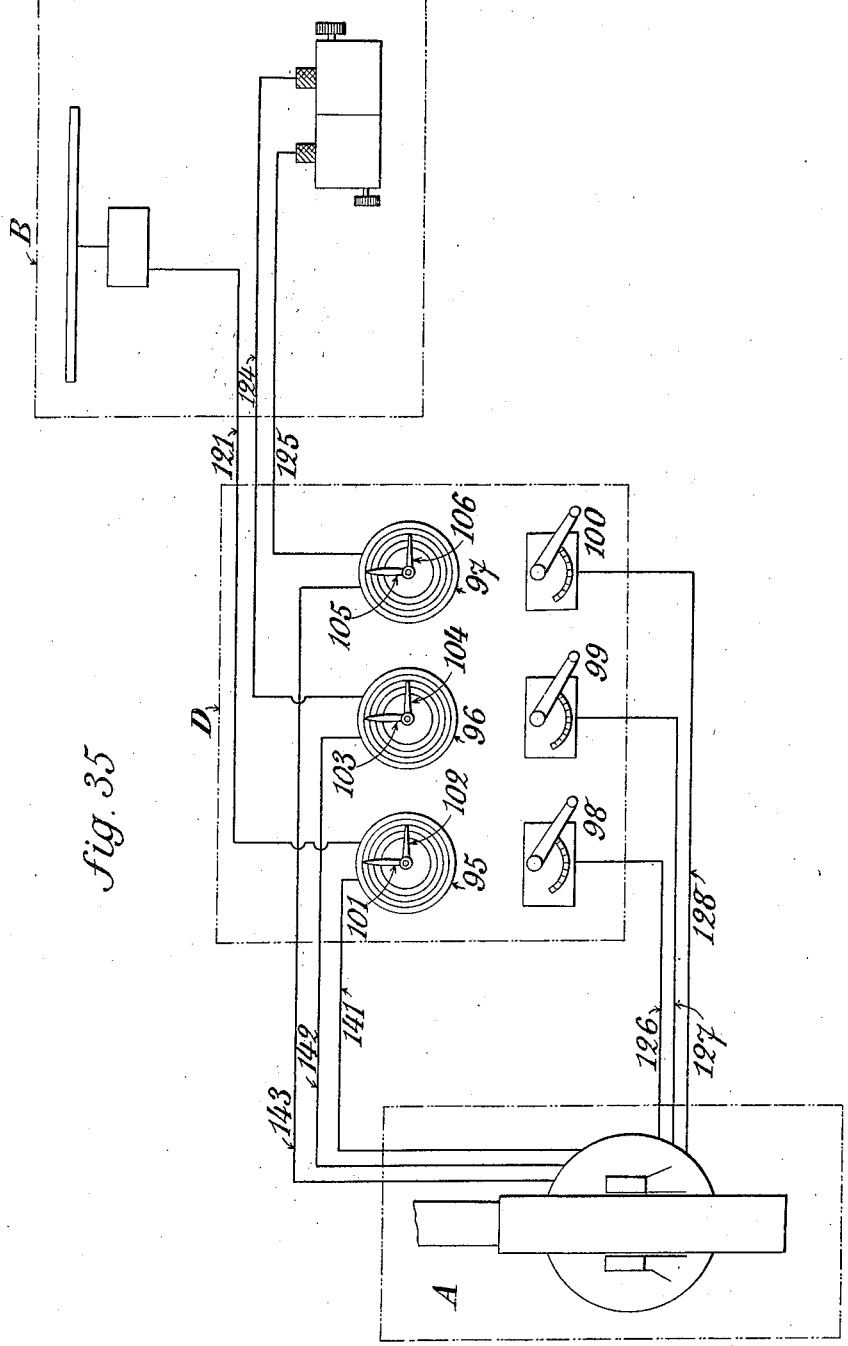

Patented Feb. 12, 1924.

1,483,483

UNITED STATES PATENT OFFICE.

EMILE RIMAILHO, OF PARIS, FRANCE, ASSIGNOR TO THE COMPAGNIE DES FORGES ET ACIERIES DE LA MARINE ET D'HOMECOURT, OF PARIS, FRANCE, A FRENCH COMPANY.

DISTANT-CONTROL INSTALLATION FOR ANTIAIRCRAFT ARTILLERY.

Application filed October 9, 1923. Serial No. 667,580.

*To all whom it may concern:*

Be it known that I, EMILE RIMAILHO, a citizen of the Republic of France, and residing at Paris, Seine Department, No. 12, Rue de la Rochefoucauld, in the Republic of France, engineer, have invented certain new and useful Distant-Control Installation for Antiaircraft Artillery, of which the following is a specification.

The present invention relates to a distant control installation for anti-aircraft artillery which comprises as a general rule one or more cannon, a central observing station and a control station.

The arrangement of the said station and the devices employed therein will be described hereunder with reference to the appended drawings which are given by way of example.

Fig. 1 is a diagram relating to the statement of the principle of the invention.

Fig. 2 is a diagram shewing a series of trajectories corresponding to different firing angles.

Fig. 3 is an elevational view of a glass disc forming a revoluble projection surface.

Figs. 4, 5, 6, 7, 8 are sections respectively on the lines A—A, B—B, C—C, D—D, E—E of Figs. 3 and 4.

Fig. 9 is an elevational view of an arrangement termed "orientation device."

Figs. 10 and 11 are sections respectively on the lines F—F and G—G of Fig. 9.

Fig. 12 is an elevational view of an alidade.

Fig. 13 is a plan view of the same.

Figs. 14, 15, 16, 17 are sections respectively on the lines H—H, I—I, J—J, K—K of Fig. 12, the line J—J being better shown on Figure 17.

Fig. 18 is an elevational view of the alidade and of an azimuth transmitting and indicating device, co-operating with the glass disc which is shewn in dotted lines.

Fig. 19 is a section on the line L—L of Fig. 18.

Fig. 20 is an elevational view on a larger scale of a portion of the azimuth transmitting an indicating device.

Fig. 21 is a section on the line M—M of Fig. 20.

Fig. 22 is a section on the line N—N of Fig. 21.

Fig. 23 is an elevational view of a regulating device for displacing the pivot of the alidade.

Fig. 24 is a section on the centre line P—P of Fig. 23.

Figs. 25 and 26 are explanatory diagrams.

Fig. 27 shews one of the curves of a chart used to convert certain data into firing elements.

Fig. 28 is an elevational view of a converting apparatus.

Fig. 29 is a vertical lengthwise section.

Figs. 30 and 31 are transverse sections respectively on the lines R—R and S—S of Figs. 28 and 29, respectively.

Figs. 32 and 33 are two vertical sections of the release device of the converting apparatus.

Fig. 34 is a plan view of the same.

Fig. 35 is a diagram of the control station.

*Principle of the apparatus.*—Let $p\,a$, Fig. 1, be the projection upon a horizontal plane of the trajectory covered by a moving target whose altitude is known at each instant.

Let B and A be the respective positions of an observing station and a cannon.

The following considerations are established upon the supposition that the aerial target, from the moment of firing the shot, will continue to move in the horizontal plane in which it is situated, according to the tangent of the last element of its course and at constant speed, for a time which is at least equal to the time of flight of the projectile.

Let $a$ be the position of the target at the time when the projectile leaves the point A, and $f$ the point at which it is attained by the said projectile.

Let $t$ be the time of flight of the projectile upon its trajectory.

Let $v$ be the velocity of the target on the tangent to the last element of its course.

The point $f$ is determined by the condition that the course $a\,f$ of the target shall be in the same time as the course $A\,f$ of the projectile.

Hence $a\,f = v\,t$.

The point $a$ represents the actual position of the target, and the point $f$ the succeeding or future position of the same.

The speed $v$ of the target on the tangent $af$ and the direction of this tangent are data which may be furnished by the observer, as will be further set forth.

On the other hand it is known that given the altitude of a point in space and the horizontal projection from this point to the cannon, one can determine the time of flight of a projectile whose trajectory ends at this point.

If one marks out the system of trajectories covered by a projectile in a given vertical plane, Fig. 2, and in identical firing conditions, at different angles of projection, and if one marks upon these trajectories the space covered by the projectile from second to second (the second being taken as the unit of time), this will afford curves for equal duration. If one produces the intersection of the vertical plane by horizontal planes at various altitudes $H, H_1, H_2$ and if one considers the points of intersection $\delta, \delta_1, \delta_2$, of the said equal duration curves with any one of the horizontal lines $x\, x'$, $x_1\, x_1'$, $x_2\, x_2'$ one will obtain upon this line a graduation for time which will permit of indicating for a given altitude the time of flight of a projectile ending at the altitude $h$ of said target.

With these data, it will be feasible to determine geometrically the succeeding or future position of the target.

In fact, let it be supposed that two graduated rulers are disposed in the horizontal plane.

One of the rulers $a\, f$, Fig. 1, is graduated from the initial point $a$ in equal spaces, each representing the horizontal projection of the space covered by the target in a unit of time; said ruler is further supposed to be constantly disposed in the direction $a\, f$ of the future position of the target.

The second ruler $A\, f$ is graduated for the altitude $h$ of the target in divisions $\delta, \delta_1, \delta_2$ according to the method above indicated, and it is further enabled to pivot on the point A. It is obvious that at the point $f$, the number which represents on the ruler $A\, f$ the time of flight of the projectile should be the same as the one representing upon $a\, f$ the time of flight of the target.

It will therefore be simply necessary to turn $A\, f$ on the point A so that the divisions corresponding to the same numbers on each ruler shall coincide at all times. The direction $A\, f$ indicates at each instant (save for ballistic corrections) the direction to be given to the cannon in order that the projectile which started from A at the instant at which the target is at $a$ will meet with this latter at $f$.

By the use of the principle as above set forth, the said distant aiming arrangement can be employed for the registering at a central observing station B and for the automatic transmission to various cannon such as A, of the necessary firing data after applying the corrections for the drift of the cannon, the effect of the wind, the parallax and the "gunner's time" or the time which elapses between the adjustment of the fuse of the projectile and the starting of the projectile.

*Determination and transmission of the firing data.*—This determination and transmission will require the use of the apparatus described in the following paragraphs 1 and 2, the said apparatus being situated at the observing station B or "central station."

§1.—Marking of the trajectory and determination of the co-ordinates of the succeeding position of the target.

(a) A telemeter for altitude.

(b) A registering device for trajectories (Figs. 3 to 11).

(c) An alidade with its azimuth transmitter and wind corrector (Figs. 12 to 24).

§2.—Conversion of the geometrical co-ordinates i. e. altitude and horizontal distance, into angle of projection and time of flight.

(a) A converting apparatus properly so called (Figs. 28 to 34).

(b) A transmitter of angles of projection (not shewn).

(c) A transmitter of times of flight (not shewn).

(d) A wind corrector (Figs. 21 to 24).

(e) A gunner's time corrector 129 (Fig. 30).

*3.—Receiving devices for the firing data.*—The three firing elements transmitted from the central observing station B are received upon suitable dials 95, 96, 97, Fig. 35, upon which the angular variation of a signal 101, 103 or 105 represents the variation of the value of the element considered, so that the three firing elements, azimuth, angle of projection and duration, are transmitted as angular indications. These angular indications are received at the control station D which comprises for the purpose (Fig. 35).

(a) A receiver for azimuths, 95.

(b) A receiver for angles of projection, 96.

(c) A receiver for times of flight (for the fuse setter) 97.

*Aiming of the cannon and setting of the fuse.*—The movements of aiming in direction, aiming for elevation and the motion of the fuse setter are transmitted from the control station to the cannon A by means of a distant control device 98, 99, 100.

*Control of the movements of the distant control apparatus.*—The positions of the cannon A as to azimuth and angle of projection are transmitted in a continuous manner to signals 102, 104, 106 placed at the control station D by transmitting apparatus analogous to those above mentioned for the transmission of the angular elements of the central station B to the control station D.

The angular indications thus received by the control station D are superimposed upon the indications received by the central station B, so that the gunner operating one of the distant control devices may regulate his action so as to maintain the two angular indications in coincidence.

*Altitude telemeter.*—The altitude telemeter (not shewn) serves to indicate automatically and at each instant the azimuth of the actual target, and for a given altitude the horizontal projection of the distance from the target to the observing station. The altitude of the aerial target is measured by the persons occupied with altimetry, and it is transmitted by telephone to the central station. The altitude telemeter does not constitute a new invention and will therefore not be described.

This apparatus is mechanically or electrically connected with the interior of a vehicle equipped as a central station, and it transmits to the above-mentioned registering device for trajectories the elements consisting of the azimuth and the horizontal distance.

In the arrangement taken as an example, the altitude telemeter is mounted upon the roof of the vehicle representing the central station and employs two gunners, one for aiming in direction and one for aiming in elevation.

The elements of the direct observation are transmitted by flexible steel bands 6 and 117 (Fig. 3) to the registering device for trajectories which is disposed within the vehicle.

*Registering device for trajectories.*—The registering device for trajectories serves to determine in a continuous manner, geometrically, and on a suitable scale, e. g. 1–20.000, the following points:

1.—The projection of the actual position of the target on the horizontal.

2.—The succeeding position of the target.

To obtain the projection of the actual position of the target, it is simply necessary to turn an alidade into a position parallel with the azimuth of the target and to mark out upon the alidade a point whose distance from the centre of rotation represents on the given scale the horizontal distance measured by the altitude telemeter.

In practice, it is preferable to leave the alidade in the fixed position and to rotate the plane surface or plate 1 of the registering device in the contrary direction to the azimuth movement of the target.

The rotation given to the plate should therefore be controlled by the azimuth movement of the altitude telemeter. For convenience in operating, the said plate 1 is disposed vertically against one side of the central station vehicle. The direction of the above-indicated movement is defined with reference to an observer stationed in the vehicle and situated opposite the plate.

In order to mark upon the plate the point representing the actual position of the aircraft, it is required to displace according to a chosen horizontal fixed radius, the apparatus termed orientation device in such manner that at any given moment the distance from its middle point to the centre of rotation of the plate 1 shall be equal (at the specified scale) to the horizontal distance of the target as measured by the altitude telemeter.

The movement of the orientation device should therefore be directly controlled by the altitude telemeter, as above indicated.

If a tracer 16 placed at the centre of the orientation device (Figs. 3 and 10) is used to mark in ink the successive points representing the positions of the actual target at constant intervals of time, e. g. 5 seconds, this will provide for the line representing the horizontal projection of the target (Fig. 25) and by measuring the distance between any two successive points, the speed of the target can be ascertained.

To determine the point $f$ representing the succeeding position of the target on the above-mentioned supposition, it is necessary to extend the tangent to this curve by a length such that the time taken by the target to cover the trajectory comprised between its actual position $a$ and its succeeding position $f$ shall be equal to the time required for the projectile to attain the target at the measured altitude.

These different problems are solved by the use of the following apparatus, i. e. the glass disc device and the orientation device.

The glass disc device 1, Figs. 3 to 8, which forms the plane surface above mentioned, comprises a circular transparent glass disc which is fitted into a ring 2 and turns in a frame 3 which is secured at its periphery to one of the rigid sides of the central station.

The said disc is guided in the frame 3 by the rollers 4 and 5 which reduce the friction to a minimum. By means of a device comprising pulleys and steel bands 6, it is given an angular movement which is exactly equal and in the contrary direction to the azimuth movement of the altitude telemeter.

A spring 7 serves to give the steel bands a suitable tension during the adjustment.

Two rigid cross-pieces 8 secured to the frame 3 have mounted thereon the roller paths 9 of the orientation device.

The orientation device, Figs. 9 to 11, essentially comprises a movable steel frame guided by the rollers 11 upon the roller paths 9 secured to the frame of the glass disc device; a disc 13 held without pressure in a circular member 14 has disposed in its suitably shaped central aperture a device 15 whose upper part in the form of a ruler is disposed upon a diameter of the disc.

Adjacent the centre of the disc, which coincides with the middle of the said ruler, a tracer 16 enclosed for a portion of its length in an iron socket serving as a plunger is slidable in a solenoid 17 which is secured to a support 18 attached to the disc 13; two terminals 19, 20 co-operating with the conducting rings 21, 22 and the brushes 23, 24 provide connections for the electric current by which the tracer is operated at intervals of time (5 seconds) as determined by clockwork.

The ruler device 15 consists essentially of two drums 25 and 26 and a small roller forming the edge of the ruler, cross-braced by the plates 28. A chart 118 provided with a set of graduated scales whose equidistant divisions vary from one scale to another is wound upon the said drums. Each scale can be brought adjacent the edge of the ruler by turning the drum 25 by means of the knob 29 (Fig. 11). A reaction spring 30 gives the proper tension to the sheet of the said chart.

The movement of the chart 118 can be effected in either direction. The said knob is held by a spring-mounted ratchet device.

The disc 13 can be rotated by the handles 31 so as to give to the ruler at each instant the direction of the tangent to the last element of the trajectory, which is automatically marked upon the disc by the tracer. Each scale which comes opposite the ruler is symmetrical with reference to the centre of the disc which corresponds to zero, i. e. to the projection of the actual target.

By turning the said knob one can increase or diminish the spacing of the divisions of the ruler, so that a group of four or five of such divisions may have the same length as a group comprising a like number of spaces between the points marked by the tracer. In this manner the said ruler will be automatically graduated in intervals representing the mean horizontal projection of the trajectory covered by the target during 5 seconds. These divisions are numbered at intervals of 5 seconds.

An aperture is formed in the wall of the said central station vehicle so that the gunner occupied with the orientation who is stationed outside the vehicle, is enabled to observe and to operate the orientation device.

The horizontal displacements of the orientation device are obtained by the traction of a steel band 117 connected to the movable element of the telemeter of altitude, the stroke of which is proportional to the horizontal distance of the aimed target; in the opposite direction the orienation device is moved by a band 130 and a spring actuated drum 131.

*Alidade with azimuth transmitter and wind corrector.*—The alidade device essentially comprises, Figs. 12 to 17, an altitude element 41 secured to the azimuth transmitter by means of a boss 42 on the main body which is secured by a screw 132 in a bracket 133 oscillating around a pivot 134 supported as it will be described farther on; within the main body of the alidade and to the right of the boss is disposed an alidade ruler 43.

In this manner, the alidade can be pivoted by hand around the centre 134 which coincide with the end marked zero of the said ruler. The ruler 43 is substantially the same as the ruler of the orientation device as above described, and it consists essentially of the two cylinders 45 and 46, a small roller 47 forming the edge of the ruler, cross-braced by the plates 48 at the ends, and of a chart 119 wound upon the cylinders 45 and 46; due to the rotation of the cylinder 45 by means of the knob 49 it is adapted to bring various graduated scales opposite the said ruler. A reaction spring disposed within the large cylinder provides for the proper tension of the sheet forming the said chart; the latter may be wound in either direction, and the knob 49 is held by a spring-mounted ratchet.

The said sheet or chart 119 which is wound upon the cylinders 45 and 46 is provided with various graduated scales $x\ x'$, $x_1\ x_1'$, $x_2\ x_2'$, Fig. 2, corresponding to altitudes such as $h\ h_1\ h_2$ varying by 50 metres distance, for example.

An aperture in one end of the casing of said ruler provides for the reading before a suitable pointer of the altitude corresponding to the scale which is adjacent the ruler.

The said pointer may be displaced in the aperture so as to provide for altitude corrections corresponding to the ballistic corrections.

*Coincidence of the graduations of the rulers of the orientation device and the alidade.*—The rulers of the orientation device and the alidade are to be placed in coincidence in such manner that at their intersection the number indicating on the alidade ruler the time of flight of the projectile shall be constantly the same as the number which indicates upon the orientation ruler the time of flight of the target.

But it becomes a difficult matter to carry out the said arrangement of the rulers in actual practice, for their thickness would be such that when superposed on one side of the registering disc it would be quite impossible to carry out the operations and readings.

This drawback can be obviated by reason of the transparency of the said registering disc, inasmuch as a ruler can be disposed on either side of the disc.

We find by experience that there is no difficulty whatever in finding the division which corresponds to the placing of the parts in concordance, and in the subsequent maintenance of the concordance by continuity.

The reading of the graduations of said rulers is performed by means of a sighting device consisting of a lens 54 and the cross-wires 55, Fig. 13.

The said sighting device is caused to travel upon a slide 56 which moves in a guide formed by the upper part of the main body of the alidade and parallel with the ruler.

The said slide can be moved to the right or left, by small succesive jumps, by means of releasing device 57.

The said device is operated as follows. The gunner has at hand two levers 58 disposed on the alidade device near its axis of rotation, and he is enabled to move the slide 56 by successive jumps; the slide moves to the right when he acts upon the right hand lever and to the left when he acts upon the left hand lever.

For this purpose the releasing device comprises a spiral spring 59 disposed in a barrel, and the two ends of the spring act respectively through the medium of speed-increasing gearing upon the two toothed rings of a differential 60.

Each of the two escapement wheels 61, secured to one of the differential rings, engages an escapement 62 which is attached to a lever 58. When one of the said operating levers is actuated, one tooth of a wheel will be released from its escapement and the slide, impelled by the rack 63 engaging a pinion 64 keyed to the central shaft of the planetary gear ring of the differential, will be moved to the right or left according as the right or left hand lever is manipulated.

Care must be taken to wind up the said spring before each firing operation, and it will have a sufficient power to operate the release device during the whole of the firing operation.

We will set forth hereinafter the manner in which the position of the slide which indicates the horizontal distance between the cannon and the succeeding position of the target is transmitted to the converting device (Figs. 28 to 34).

*Relative movement of the registering disc and the alidade.*—In order to properly observe the relative positions of the several elements of the arrangement and their geometrical significance, reference should be made to Fig. 25.

The circle $P P_1$ represents the glass disc whose center is at B, said disc having a vertical position in the central station; the horizontal line BO represents the locus of the centre of the orientation device which is displaced behind the disc. As above stated, we mark out by various points a curve which represents (at a 1–20.000 scale) the horizontal projection of the course of the tangent up to the present instant $t$.

If upon this horizontal projection we place the point A representing the position of the cannon situated at a given distance A—B from the observing station, and if we turn the said disc so as to bring the line B—A into coincidence with the above-mentioned horizontal line, and again, if we mark as zero upon the edge of the disc the zero of the azimuths, it will be observed that if the disc should be set in motion by means of the altitude telemeter which is following the target, the point representing the actual target will in all cases fall upon the horizontal line B—O; but the point representing the position of the cannon will come upon a certain place $A_1$.

The pointer before which the graduations for the azimuths of the cannon A are caused to move is so disposed that when the indicated azimuth is zero, the vertical plane comprising the centre line of the cannon will pass through the central station.

When the disc 1 is turned by reason of the motion of the target so that A is brought to $A_1$, the azimuth to be given to the cannon in order that the vertical plane passing through its centre line shall meet the target will consequently be the angle $a A_1 O_1$.

Upon the surface on which the trajectory is represented, $a$ will indicate the succeeding horizontal projection of the target, and $B—A_1$, the base line connecting the central station with the cannon.

The apparatus is so disposed that the centre of rotation 134 of the alidade may be rendered integral with the disc at the point A; during the rotation from A to $A_1$, it will thus be brought to $A_1$, and the alidade will have the position $A_1$—$a$. If it had been desired to aim upon the actual position of the target, the alidade would be maintained in coincidence with the indicating point $a$, and the variable angle $a A_1 O_1$ would be transmitted to the cannon. But it is in fact required to aim upon the succeeding or future point of the target, and as above mentioned the point indicating this latter is located at $f$ and its position has already been defined, so that the angle to be given to the cannon will therefore be $f A_1 O_1$.

The azimuth to be transmitted to the cannon will thus be constantly equal to the angle between the alidade and the base radius $B—O_1$ of the disc; the actual horizontal distance between the cannon and the horizontal projection of the succeeding position of the target will be represented by $A_1 f$.

*Construction of the azimuth indicating device* (Figs. 18 to 24).—A metallic disc 65 rotating on an axis supported by a socket 135 and situated in line with the axis of the said glass disc is provided with a slide 66 which allows the movement of the pivoting axis 134 of the alidade 41 by a certain amount corresponding to the distance between the cannon and the central station. The slide 66 can for this purpose be moved by a screw 68 mounted in the said metal disc and co-operating with a nut 69 secured to the said slide; at the end of the said screw is mounted an operating head 70 (Fig. 24). Two bolts with fly-nuts 71 and 72 ensure the rigid mounting of said slide 66 upon the metal disc 65 when the setting has been effected; the disc 65 is drawn with the glass disc in its rotation movement by means of a mechanical control which consists of two pinions 73, 74 and the shaft 75, journaled in the socket 135 which is secured to the frame 2 of the glass disc.

To recapitulate, the metallic disc $p \; p_1$, Fig. 26, is secured to the glass disc and rotates with the latter, drawing with it the pivoting axle 134 of the alidade.

It is therefore the angle $f \, A \, O$ which is to be transmitted to the control station which operates the cannon. This angle is indicated on a dial 67 supported by a casing 76 which oscillates with the alidade around a boss 139 on the slide 66, the axis of this boss coinciding with the axis of the pivot 134.

However in order to facilitate the readings, this angle is so transformed by a set of speed-increasing gears 136, 137 that the angle indications are received upon two concentric scales. Over one of the said scales a pointer 78 runs which describes a circumference when the azimuth varies from 0 to $2 \pi$; the scale is graduated in 40 divisions each corresponding to 100 decigrades. The second scale has a pointer 79 which describes a circumference when the azimuth varies by 100 decigrades.

*Transmission of the firing elements to the control station operating the cannon.*—As a general rule the firing data such as the azimuth, angle of projection and time of flight, may be indicated by the position of a point which is movable upon a graduated circle, so that the problem of the electric transmission of the said data will be confined to the displacement of a signal upon a graduated receiving dial situated at the control station, this displacement being in synchronism with that of the movable member upon the graduated circle of the transmitter. This problem has been solved in various arrangements used for the distant control of cannon on shipboard.

One of the said arrangements is employed in the proposed installation, but it need not be described.

*Wind corrector for drift.*—Corrections of this kind are given by a wind disc (an apparatus in current use for anti-aircraft artillery) which is observed during the firing at certain times by the chief operator of the station. The corrections are expressed as increase or diminution of the azimuth, and are applied to the transmitting apparatus by means of a correcting device mounted upon the pivoting axle of the alidade and enabling variations to be made in the azimuth angle transmitted to the said control station (Figs. 21 and 22).

This arrangement comprises a graduation which indicates the value of the correction and is actuated by means of a worm gear 138 and a knob 120.

*Wind disc* (Figs. 23 and 24).—The wind disc essentially comprises a dial 107 which is rotated by the said glass disc 1 of the registering device. The axis of the dial 107 is in line with the axis of the disc of the registering device.

A second dial 108 which is concentric with the first-mentioned dial and may be turned with reference to a base mark upon the latter according to the direction of the wind, is provided with a chart serving on the one hand to give the value of the correction for direction and on the other hand to give the value of the correction for the horizontal distance. Two graduated rulers 109 and 110 which are secured to the frame of the course-registering device and are perpendicular to each other are disposed in front of the dial 108. Two slides 111 and 112 are respectively movable upon the said rulers; each slide has a pointer 113 or 114 for determining the position of the slide for a given speed of the wind. The corrections are read upon the scales of the disc, opposite the pointer 115 or 116 of the respective slide. One of the slides gives the wind correction for the direction and the other the correction for the range and the time of flight, converted into correction for the horizontal distance.

*Conversion of the geometrical co-ordinates i. e. altitude and horizontal distance, into angles of projection and time of flight.*—This conversion is based upon the use of a chart which is prepared as follows; Fig. 27.

Let $o \, x$ and $o \, y$ be axes of co-ordinates; the abscissae represent on a chosen scale the values of the horizontal distance to the target in its succeeding position, and the ordinates, also to a chosen scale, represent the values of the angle of projection for an altitude $h$.

A curve A B C D corresponds to each value of the altitude $h$. The chart is formed by a set of curves H drawn for altitudes which vary by 50 metres, for example. On the same sheet we form a chart constituted by the set of curves K, not shown, which for a constant altitude represent the variation of the time of flight relative to the horizontal distance.

We will indicate hereunder the mechanical arrangements for transmitting the angle of projection and the time of flight to the cannon.

*Converting device properly so called* (Figs. 28 to 34).—The above-mentioned chart or sheet is wound upon a cylinder 80 so that the ordinates will become generatrices of the cylinder. The axis of the cylinder is represented by a shaft 81 supported through the medium of ball-bearings by two cross-pieces 82 which with the cheeks 83 form the main frame of the apparatus.

The cylinder 80 is revoluble in either direction, by small successive jumps, by means of a releasing device 84 which resembles the corresponding device of the alidade above mentioned, and it operates in concordance with the latter.

The value of the jumps measured upon the circumference of the cylinder is exactly equal to the value of the rectilinear movements of the slide of the alidade 41.

The mechanism of the release device 84 is similar to that of the like device of the alidade; an electro-magnetic control 140 actuates the escapments of the release device when the levers of the release device of the alidade are operated.

The gunner occupied with the alidade thus turns the cylinder in one direction when he operates the right hand lever 58 and in the inverse direction when he operates the left hand lever 58.

A pointer 85 is moved by a slide 86 which is slidable in a guide formed by the upper part of one of the cheeks of the converting apparatus.

The said slide can be moved to the right or left by small successive jumps by means of a rack 87 and a releasing device 88 similar to the device of the alidade.

The gunner occupied with transmitting the angles of projection may follow one of the curves H of the chart (corresponding to the given altitude) by means of the pointer of the slide, and to this end he gives various impulses to the slide in the proper direction so that the curve H will be constantly included between the successive positions of the end of the pointer 85.

At the other side of the converting cylinder and in symmetrical position is disposed a rack 89 for operating a second slide 90, and a releasing device 88ª resembling the device 88.

The gunner occupied with transmitting the time of flight operates the slide 90 by successive impulses so that the pointer of the slide will constantly coincide with one of the curves K of the chart which represents for each altitude the variation of the time of flight relative to the horizontal distance.

*Transmitter of angles of projection.*—The transmitter of angles of projection is an apparatus analogous to the one described for the transmission of azimuths. Each impulse given to the slide 86 by the release device 88 will cause a disc 91 to turn through a certain angle, and the rotation of the said disc is electrically transmitted to a receiving apparatus for angles of projection disposed at the control station.

*Transmitter of time of flight.*—This apparatus is the same as the preceding, and it is symmetrically disposed relative to the centre line of the converting apparatus; 92 indicates the disc of the said transmitting apparatus corresponding to the above-mentioned disc 91.

The receiving apparatus for the time of flight is also similar to the one used for angles of projection, differing only in the graduation of the dial.

*Wind correcter for range and time of flight.*—In the same manner as for the azimuth, the value of certain corrections for range and for time of flight which are due to the effect of the wind, is ascertained by observing the wind disc, this being consulted at intervals during the firing by the chief operator of the station. The corrections are given in the form of increase or diminution of the horizontal distance, and are applied to the converting apparatus by means of a correcting device 93 mounted upon one of the cross-pieces 82 which gives the algebraic sum of the corrections for horizontal distance transmitter by the gunner occupied with the alidade and causing the whole of the release device to oscillate around the axis of the cylinder.

*Corrector for gunner's time.*—The cannon to which the firing data are transmitted according to the present distant control installation are loaded in an automatic manner, so that the gunner's time, as it is called, which elapses between the adjustment of the fuse and the firing of the shot will have a constant value. In this manner the correction for gunner's time can be made with facility.

The said correction is obtained by the following mechanical arrangement.

Let $\theta$ be the gunner's time or the interval between the instant $t$ at which the fuse is regulated and the instant of firing.

Were no corrector used with the apparatus, the regulation of the fuse would be retarded by an amount equal to the variation of the pointer of the regulating apparatus during the time $\theta$, so that this variation constitutes the correction for the gunner's time, it being necessary to add this correction in the algebraic sense (according as the target approaches or recedes) to the time θ of the trajectory upon the chart which corresponds to the horizontal distance of the instant at which the fuse is regulated.

This correction is to be made by the gunner occupied with the transmission of the time of flight, since his apparatus is so constructed that he is enabled to find the value of the same with facility, for in fact the value of this variation will be exactly represented by the number of impulses which the gunner has given to the slide during the period designated as gunner's time; by reason of the construction of the converting apparatus and the form of the chart, each impulse will correspond to one tenth of a second of the time of flight.

For this purpose, suitable clockwork is regulated so as to strike a bell at intervals of time equal to θ, and the gunner transmitting the time of flight will simply count the number of impulses which he gives to the slide 90 to the right or left in the interval between two strokes of the bell, and he will thus obtain the value of the variation of the time of flight during the time θ in sign and in quantity. By means of a small dial corrector 129 mounted upon the said slide and graduated in 1/10th seconds of time elapsed in either direction from zero, he is enabled to give at once to the pointer of the slide 90 the advance or retardation corresponding to the correction for the gunner's time.

*Receiving arrangements for the firing data.*—The firing data are received at the control station used for each cannon.

*Installation of the control station* (Fig. 35).—The control station D is installed in an auxiliary vehicle which is situated at a few metres from the cannon and can be used as a tractor for the same.

In this station are seated the three gunners for the cannon which are respectively occupied with the azimuth, the angle of projection and the time of flight. Opposite each is the receiving dial for the firing element in question; 95 indicates the azimuth dial, 96 the dial for angles of projection and 97 the dial for the time of flight.

The electric circuits between the observing station B and the control station D permit of connecting the transmitting apparatus for azimuths, angles of projection and time of flight respectively with the abovementioned apparatus, and the firing data can thus be received.

By the use of a distant control device, each gunner can vary at a distance the positions of the cannon A for the azimuth and the angle of projection as well as for the disposition of the fuse setter for the time of flight. The said device utilizes electric current from a generating plant installed upon the auxiliary vehicle, and the gunners supply this current to the receiving apparatus which actuate the aiming and the regulating devices. To this effect; each gunner has within reach an operating handle 98, 99 or 100 of the current regulator.

As above stated, the movements of the cannon A and the fuse setter are registered and are transmitted as angular values to the control station D by angle-transmitting devices which are similar to the devices above described, these movements being transmitted by means of lines 141, 142, 143.

The transmission of an azimuth element is represented at the receiving station, as above mentioned, by two signals whereof one indicates the actual azimuths and the other the amplified azimuths. The transmission of angles of projection and time of flight comprises at the receiving end two signals whereof one indicates the angles actually covered and the other the same angles amplified.

Opposite each gunner is a dial having upon two double concentric circular discs the suitable movable signals of different colours such as 101, 102; 103, 104; 105, 106.

One signal of each pair is produced by the transmitting apparatus of the observing station; the second signal is produced by a transmitter disposed upon the cannon which registers and also transmits the firing element which has been applied to the cannon by means of the distant control-device, so that one of the signals will depend upon the observing station and the second signal will depend upon the gunner himself since by means of the distant control device he actuates the driving mechanism of the cannon and the fuse setter. The function of this gunner thus consists in displacing the signal under his control so as to bring and to maintain the same in coincidence with the other signal.

The said distant aiming and distant control apparatus will provide for the instant aiming of the cannon and the adjustment of the fuse in accordance with the firing data suitable for the subsequent or future position of the target, which position is found in an equally instantaneous manner by the observing post, but it is also important to be able to fire upon an aerial target in case the electric transmission circuit for the firing data should be broken and the observing and the control stations are connected only by a telephone line.

For this purpose the distant control-devices for azimuth, angle of projection and fuse setter are duplicated upon the cannon by hand-operated devices which register upon visible graduations the firing data transmitted to the cannon by the three controlling gunners, and in this case the gunners will occupy their positions upon the gun carriage itself.

In this event, a three wire telephone line connects the three gunners of the central station occupied with the azimuth, angle of projection or time of flight respectively with the three gunners at the cannon who are occupied with the corresponding data.

The first are provided with microphone transmitters and the second with telephone head-pieces.

The operation of the whole of the distant aiming or pointing system is as follows:

The same requires the intervention of two observing gunners who control the altitude range-finder (not shewn), two gunners placed on both sides of the plate 1 and controlling the one of the pointer 13, the other, the alidade 41, a correcting gunner charged of adjusting or setting the indexes 111, 112 of the wind plate and the button 120 of the azimuth corrector, two other gunners placed on both sides of the transformer 80 and operating the one the carriage 86, and the other the carriage 90, and finally three gunners placed at the commanding post and operating the crank-handles 98, 99, 100 which determine the automatic motions of the gun or piece of ordnance and of the fuse setting device.

Before all, the button 70 is operated so as to displace the carriage 66 and consequently the axis 42 of the alidade so that the distance between this axis or pin and the center of plate 1 will correspond to the distance between the observation post B and the gun A. The nuts 71, 72 are then locked.

One of the observing gunners causes the altitude range-finder (not shewn) to pivot about a vertical axis so as to follow the moving target, and causes, at same time, through the medium of the bands 6, the revolution of the plate 1 so that the position of the latter will constantly correspond with the observed azimuth of the target.

The second observing gunner causes the apparatus to indicate the altitude or height of the air-ship, which is given to the same, and operates the range-finder so as to follow the movements of the air-ship in site, this automatically determining the horizontal distance of the air-ship at the observation post.

Through the medium of the band 117 connected with the horizontal sliding index of the range-finder, the pointer 13 is horizontally shifted so that the distance from its centre, that is to say that the distance from the tracing style 16 to the center of the plate 1 will constantly correspond to the horizontal distance of the target at the observation post.

The gunner in charge of the orientation device has for his duty to turn this device by means of the handles 31 so as to constantly maintain the rule 27 pointed according to the tangent at the end of the curve which is automatically traced in dotted lines on the plate 1, and also to move the chart 118 by means of a button 29 so as to bring over this tangent one of the scales of the chart, so that the intervals of the last points of the curve will correspond as exactly as possible with the intervals between the divisions of this scale.

At same time, the gunner or servant in charge of the alidade having started to act upon the button 49 so as to bring over the edge of the alidade that scale of the chart 119 which corresponds to the altitude as indicated, causes the alidade to pivot about the axis of its support, so as to constantly maintain coincident two divisions bearing the same number, the one on the scale of the chart 118, the other on the scale of the chart 119; at same time, he moves the index or runner 56 in operating the keys 58, in order to maintain the same on the division of scale on the chart 119 which coincide with the division bearing the same number on the chart 118.

On the other hand, the correcting gunner operates the button 120 according to the indications of the wind plate (index 115) in order to correct the azimuth according to the speed or rate of wind.

It results of these combined operations, as previously described:

1st, that the angle formed between the edge of the alidade and the original radius on the plate 1 is constantly equal to the azimuth which is to be given to the gun so that the (corrected) vertical plane of firing passes through the future position of the target, and 2nd, that the distance between the runner 56 and the zero of the alidade scale (course of the rack 63) will constantly correspond to the distance between the gun and the future position of the target.

The corrected azimuth is continuously transmitted through electro-mechanical devices (not shewn) and through the wire 121, to the signal 101 of the commanding post, and at same time, the current impulses produced by the striking of the keys 58 have for effect to cause the cylinder 80 to revolve in accordance with the variations in the future horizontal distance between the gun and the target. This revolution is furthermore corrected by a gunner or servant by means of the button 93 according to the indications of the wind plate.

While the cylinder 80 is revolving, the two respective gunners operate the keys 122, 123 controlling the carriages 86 and 90 so as to maintain everyone of the pointers 85 and 124 coincident with the one of the curves traced on the two respective charts which corresponds to the indicated height.

The result is that the motions of the carriages 86 and 90 constantly correspond the one to the angle of projection and the other, to the duration of travel or course which refer to the future position of the target. As already explained, the gunner who controls the carriage 90 adjusts the small corrector of this carriage in order to take the gunner's time into account.

The impulses of current produced by the striking of the keys 122, 123 and transmitted through the wires 124, 125 have for effect to move the signals 103 and 105, at the observation post, in accordance with the said duration of travel.

It is then only necessary for the three gunners at the commanding post to operate the handles 98, 99, 100 for producing the automatic operation of the gun A and of its fuse setting device through the wires 126, 127, 128 and electro-mechanical devices (not shewn), this operation being such that the repeating signals 102, 104, 106 remain always in coincidence with the signals 101, 103, 105.

Claims:

1. A system of pointing at a distance for artillery, comprising an observation post, a post for the registration and the transformation of the observed coordinates, a commanding post and a firing post, the observation post comprising an altitude telemeter or range-finder which registers the observed azimuth of the target and its true horizontal distance from the observation post, the post for the registration and transformation of the observed coordinates comprising a revolving plate, transmitting means between the said telemeter and this plate in order to cause the latter to revolve in accordance with the observed azimuth, means which are electrically controlled at regular intervals of time in order to trace upon this plate series of dots which represent, on a given scale, the course followed by the target, scales divided into units of time representing horizontal distances at different uniform rates or speeds, means moved by hand for placing one of these scales in the extension of the last fraction of travel traced on the plate, an alidade moved by hand pivoting about a fixed point of the plate, scales divided into units of time representing the horizontal distances travelled over by projectiles fired according to different angles of projection, means moved by hand so as to place the scales over the edge of the said alidade passing through the said fixed point of the plate and means moved by hand for moving a carriage along said alidade, the same post comprising also a revolving cylinder, transmitting means between the driving member of said carriage and this cylinder in order to cause the latter to revolve in conformity with the distance between the carriage and the pivoting point of the alidade, charts provided on this cylinder and referring: the one, to the angles of projection, and the other, to the durations of travel of the projectiles, carriages adapted to move parallelly to the axis of said cylinder, pointers of these carriages, driving means for moving these carriages adapted to bring and maintain the said pointers in coincidence with curves of the said charts, the said commanding post comprising revolving signals which respectively refer to the future azimuths, to the angles of projection and to the durations of travel of the projectiles, transmitting means connecting one of these signals with the plate and with the alidade so as to transmit the angles of relative displacement of these last parts, that is to say the future azimuths and connecting the two other signals with the means for operating the two carriages of the cylinder in order to transmit the angles of projection and the "times" or durations of travel, the said commanding post also comprising apparatuses for the control at a distance, operated by hand, so as to move at the firing post the gun and its fuse setting device, one of these apparatuses being adapted to point the gun as to the azimuth and the second to point the same as to the height and the third to operate the fuse setting device, and also repeating signals placed close to the above-mentioned signals and the firing post comprising, besides the gun and its fuse setting device, apparatuses for the control at a distance adapted to transmit to the said repeating signals the azimuth and the angle of projection as received by the gun and the indication of the time given to the fuse setting device.

2. In a system of pointing or aiming at a distance for artillery, the combination of means for tracing over a plane surface, on a given scale, the course or travel of the target as the same is travelled over, and of means for forming on the same plane surface according to the tangent at the end of this tracing a rectilinear extension representing, on the same scale, the course the target is supposed to be travelling over while the projectile is moving in order to reach the same.

3. In a system of pointing at a distance for artillery, the combination of a fixed frame, a plate and a support rotatably mounted on this frame about a same axis, connecting means for causing this plate and this support to revolve together, a movable carriage having a boss and guided radially and fixed in an adjustable manner to this support, a box or casing pivoted about the said boss, a pivot on this box placed on the axis of the boss, a second support fixed to said box so as to be adjustable about said pivot, an alidade secured to the second support, an edge of this alidade being placed so as to pass through the axis of said pivot and against a face of said revolving plate.

4. In a system of pointing at a distance for artillery, the combination of a plate adapted to pivot about its axis, means for causing this plate to revolve relatively to the observed azimuth of the target, a fixed guide placed in a radial direction with reference to the said plate, a frame sliding along this guide, a support pivoting in this frame having a rule whose edge passes through its pivoting center and against the said plate, means for causing this frame to move over said guide to an extent in proportion to the horizontal distance separating the target from the observation post, chart on this pivoting support comprising several scales adapted to be successively brought over the edge of said rule, a tracing style placed at the center of said pivoting support and adapted to print dots on said plate at regular intervals of time, a pivot, an alidade movable about this pivot, means for carrying and maintaining this pivot at a distance from the center of the plate in proportion to the distance between the observation post and the gun to be controlled, these supporting means being adapted to revolve about the axis of said plate and to drive along the said pivot in connection with this plate, the said alidade having an edge which passes through the axis of said pivot and against the said plate, a chart on this alidade having scales which are adapted to be brought successively over the edge of the rule of the alidade and a carriage sliding along the alidade and adapted to be brought opposite the crossing point of the two said rules where are located divisions of same number as the scales used.

5. In a system of pointing at a distance, the combination of an alidade, a carriage sliding along this alidade, and means for operating this carriage comprising a motive spring barrel, a differential gear, gears connecting one of the lateral wheels of the said train to the box or casing of the said barrel, two escapement wheels connected with the said lateral wheels of the train, two respective lever escapements, driving means for moving these lever escapements separately, a pinion connected with the planetary wheel carrier of the differential gear and a rack moved by this pinion and attached to the said carriage.

6. In a system of pointing at a distance for artillery, the combination of a cylinder movable about a fixed axis, chart provided on the surface of this cylinder, two guides parallel to the axis of this cylinder, two carriages sliding on these guides, pointers provided on these guides, means operated from a distance to cause the said cylinder to rotate in both directions in conformity with the variations of horizontal distance between the gun and the future position of the target, means operated by hand to move the said carriages independently the one from the other, and means for slightly shifting one of the said pointers over the corresponding carriage for the purpose of compensating the gunner's time elapsing between the adjustment of the fuse of the projectile and the firing of the latter.

7. In a system of pointing at a distance for artillery the combination of a transparent plate adapted to rotate around its centre, a movable frame guided along a straight fixed line passing through the centre of said plate, a support adapted to pivot around a point of said frame, a rule upon said support the edge of which passes through the said point of pivotment and against one of the faces of said plate, an alidade movable around a point of said plate, said alidade having an edge which passes through the said point of pivotment and against the second face of the transparent plate and graduated scales upon the edges of said rule and upon said alidade.

In testimony that I claim the foregoing as my invention, I have signed my name in presence of a subscribing witness.

EMILE RIMAILHO.

Witness:
MAURICE ROUX.